Patented Oct. 11, 1949

2,484,369

UNITED STATES PATENT OFFICE 2,484,369

LIQUID CONDENSATION POLYMERS OF BIS(HYDROXYALKYL) SULFIDES AND BIS(HYDROXYALKYL) POLYSULFIDES

Seaver A. Ballard, Orinda, Rupert C. Morris, Berkeley, and John L. Van Winkle, San Lorenzo, Calif., assignors to Shell Development Company, San Francisco, Calif., a corporation of Delaware No Drawing. Application October 8, 1946, Serial No. 702,053

11 Claims. (Cl. 260—608)

This invention relates to novel lubricating compositions. More particularly, it relates to the use of certain polymeric substances, containing ether and thioether or polysulfide linkages, as improved lubricants or lubricant additives.

Mineral oil fractions may be used for many lubricating purposes, but it is well-known that such lubricants possess certain inherent limitations, such as tendency to oxidize, thicken at low temperatures, etc. A large number of additives have been employed in conjunction with mineral oils to improve these defects. To a certain degree, the resulting compositions may be used successfully for most lubricating purposes. However, lacquer formation results from the use of many of such additives.

Various synthetic lubricants have been proposed from time to time. These include polymers of cracked wax olefins, alkylated aromatics, such as alkylated naphthalenes, and so on. Some of these are useful for special purposes, but, especially if the previously known synthetic lubricants were derived from olefinic sources, they usually possess corrosion and oxidation characteristics limiting their utility to a substantial degree.

Another type of synthetic lubricant which has been investigated is the alkylene oxide polymer type, such as polymerized propylene oxide. Such polymers are useful under mild operating conditions.

The preparation of adducts of certain unsaturated compounds with hydrogen sulfide or mercaptans has been proposed. However, a complicated mixture of derivatives having widely varying molecular weights is present in the adduct product. The mixture prepared by previously proposed methods contains relatively large proportions of volatile constituents, with a correspondingly lower fraction having lubricating properties.

It is an object of the present invention to provide a novel method for the production of a non-hydrocarbon lubricant. It is another object of the present invention to provide a novel method for the preparation of a lubricant useful at low temperatures. It is still another object of this invention to provide a novel method for the preparation of a lubricant possessing inherent extreme pressure properties.

It is a further object of the present invention to provide novel polymeric materials comprising chain-like structures with terminal hydroxyls or conversion products thereof. Other objects will become evident from the following disclosure.

Now, in accordance with this invention it has been found that superior synthetic lubricants may contain or comprise polymers of compounds having the general structure

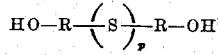

Still in accordance with the present invention it has been found that polymers having the general structure

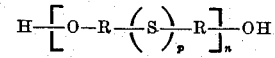

and conversion products thereof, form superior lubricating compositions. Again in accordance with the present invention it has been found that the preferred method for preparing such polymers is to heat the monomeric substance in the presence of dehydration catalysts. In the above structural formulas, $n$ is an integer greater than 1, $p$ is an integer and each R is an organic radical, preferably a saturated hydrocarbon radical.

The monomeric substances from which the polymers of the present invention are prepared include thioethers (when $p$ is 1) and polysulfides (when $p$ is greater than 1). Thioethers having the general structure

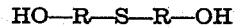

are of primary, secondary, tertiary or mixed configuration.

Primary thioethers having the general structure

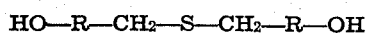

include those in which each R is a hydrocarbon radical, preferably a saturated aliphatic hydrocarbon radical containing from one to 12 carbon atoms. Such thioethers include bis (2-hydroxyethyl) sulfide, bis (2-hydroxypropyl) sulfide, bis (3-hydroxypropyl) sulfide, bis (2-hydroxybutyl) sulfide, bis (3-hydroxybutyl) sulfide, bis (4-hydroxybutyl) sulfide, bis (2-hydroxyamyl) sulfide, bis (3-hydroxyamyl) sulfide, bis (4-hydroxyamyl) sulfide, bis (5-hydroxyamyl) sulfide, and sulfides of higher molecular weight such as bis (6-hydroxyhexyl) sulfide, bis (7-hydroxyheptyl) sulfide, bis (8-hydroxyoctyl) sulfide, bis (9-hydroxynonyl) sulfide, bis (10-hydroxydecyl) sulfide and bis (12-hydroxydodecyl) sulfide. It will be noted from the above that the hydroxyl group may be on a terminal hydroxyl (i. e. attached to the carbon atom furthest removed from the sulfur atom) or may be on other carbon atoms of the radicals attached to the thioether sulfur atom. Those monomers having the hydroxyl group on terminal carbon atoms form polymers having optimum lubricating properties.

The primary thioethers may have similar radicals attached to the thioether sulfur atom, such as those detailed above, or they may have dissimilar radicals such as 2-hydroxyethyl-2-hydroxy-propyl sulfide, 2-hydroxyethyl-3-hydroxypropyl sulfide, 2-hydroxyethyl-4-hydroxybutyl sulfide, 4-hydroxybutyl-5-hydroxyamyl sulfide, 3-hydroxybutyl-4-hydroxyamyl sulfide, etc. Although polymers may be prepared from mixed thioethers, according to the present invention, it has been found that the most versatile polymeric lubricants are prepared from thioethers having similar radicals.

Primary thioethers having the above structure may be formed, for example, by reaction of hydrogen sulfide with an unsaturated alcohol in the presence of sensitizers or catalysts, such as ultra violet radiations or peroxides.

A typical preparation of this character is that of the condensation of hydrogen sulfide with allyl alcohol, as follows:

Five hundred parts allyl alcohol and 124 parts hydrogen sulfide were mixed in a quartz tube and irradiated near a 250 watt mercury arc lamp for two hours. During the first hour the pressure rose from 140 p. s. i. to 190 p. s. i., after which it fell to 160 p. s. i. In this time the temperature increased from 100° C. to 150° C., due in part to the exothermic character of the reaction, but mainly due to the heat from the mercury arc lamp. The product was subjected to fractional distillation, that part remaining in the still above 134° C. at 0.3 cm. Hg pressure being bis(gamma-hydroxypropyl) sulfide.

Suitable alcohols for the preparation of primary dihydroxythioethers include isopropenyl alcohol, allyl alcohol, crotyl alcohol, methallyl alcohol, and their homologs, analogs and substitution products.

Secondary thioethers useful for the preparation of the subject lubricants have the general structure

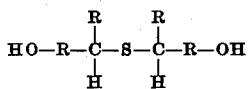

wherein each R is a hydrocarbon radical, preferably a saturated aliphatic radical having from 1 to 12 carbon atoms.

Such thioethers include bis (1-methyl-2-hydroxyethyl) sulfide, bis (1-ethyl-2-hydroxyethyl) sulfide, bis (1-ethyl-2-hydroxyethyl) sulfide, bis (1-propyl-2-hydroxyethyl) sulfide, bis (1-ethyl-2-hydroxypropyl) sulfide, bis (1-methyl-3-hydroxypropyl) sulfide, bis (1-isopropyl-3-hydroxypropyl) sulfide, bis (1-ethyl-4-hydroxyamyl) sulfide, bis (1-methyl-6-hydroxyhexyl) sulfide. Mixed secondary thioethers likewise form suitable polymeric lubricants. These include (1-methyl-2-hydroxyethyl) (1-methyl-3-hydroxypropyl) sulfide, etc. Other secondary thioethers forming polymeric lubricants have branched chains such as bis (1,2-dimethyl-3-hydroxypropyl) sulfide, bis (1,2-diethyl-3-hydroxypropyl) sulfide and bis (1,3-dimethyl-4-hydroxybutyl) sulfide. The secondary thioethers forming the most satisfactory polymeric lubricants are those in which the radicals are similar and in which the hydroxyl groups are attached to terminal carbon atoms of each radical.

Secondary thiothers are produced, for example, by the reaction of hydrogen sulfide and unsaturated alcohols in the presence of such catalysts as metallic oxides and hydroxides, amines, pyridine, piperidine, etc. Typical of such reactions is reaction between allyl alcohol and hydrogen sulfide in the presence of di-n-butylamine.

One hundred sixteen parts allyl alcohol, 35 parts hydrogen sulfide and 12.9 parts di-n-butylamine were heated together in an autoclave at 100° C. for 48.5 hours. The product was subjected to distillation, the lubricating fraction being that part of the product boiling above about 134° C. at 0.3 cm. mercury pressure and consisting essentially of bis (beta-hydroxy-alpha-methylethyl) sulfide. A by-product obtained in the reaction was beta-hydroxy-alpha-methylethyl mercaptan.

Tertiary thioethers may be polymerized according to the method of the present invention, to yield lubricating compositions. These thioethers have the configuration

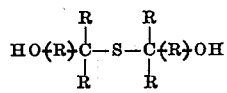

wherein each R is an organic radical especially a hydrocarbon radical. These include such thioethers as bis (dimethylhydroxymethyl) sulfide, bis (1,1-dimethyl-2-hydroxyethyl) sulfide, etc.

Other thioethers useful in the preparation of polymeric lubricating compositions include those having both a primary and a secondary radical, or a primary and a tertiary radical, or a secondary and a tertiary radical attached to the thioether sulfur atom. Typical of such thioethers are (2-hydroxyethyl) (1-methyl-2-hydroxyethyl) sulfide, (2-hydroxyethyl) (1,1-dimethyl-2-hydroxyethyl) sulfide and (1-methyl-2-hydroxyethyl) (1,1-dimethyl-2-hydroxyethyl) sulfide.

The dihydroxyalkylpolysulfides from which the polymeric lubricants of the present invention may be prepared have structures similar to those of the thioethers discussed hereinbefore except that the single sulfur atom of the thioether is replaced with a sulfur group containing more than one sulfur atom. The most satisfactory members of this class for the preparation of superior synthetic lubricants are the disulfides, especially the bis (hydroxyalkyl) disulfides wherein each radical attached to the disulfide group has a hydroxyl group attached to a terminal carbon atom. Such disulfides may be produced, for example, by the following procedure:

Ninety-two parts gamma-mercaptopropyl alcohol were treated with 56 parts potassium hydroxide in aqueous solution. To the solution of the potassium salt so formed, 126 parts iodine were added dropwise, starting at room temperature. The product so formed was water-washed and unreacted material was removed by fractional distillation in order to recover bis (gamma-hydroxypropyl) disulfide.

Other polysulfides which may be used to form satisfactory polymeric lubricants inlude bis (beta-hydroxyethyl) disulfide and bis (beta-hydroxypropyl) disulfide. The radicals attached to the thioether or polysulfide group may contain in addition to carbon and hydrogen, such substituents as carboxyl, hydroxyl, and carbonyl groups, or such additional elements as oxygen, sulfur, nitrogen or phosphorus.

The polymeric lubricants which form a part of the present invention are prepared by heating one or more of the thioethers and/or polysulfides having the structures discussed hereinbefore in the presence of catalysts promoting dehydration. Such catalysts include strong concentrated mineral acids such as sulfuric acid or nitric acid, concentrated halogen acids such as hydrogen chloride, hydrogen bromide or hydrogen iodide and organic sulfonic acids such as paratoluenesulfonic acid.

Dependent upon the nature of the monomer, the identity of the catalyst, the temperature of the polymerization reaction and the polymerization rate desired, the catalyst may be used in ratios with the monomer varying from about 1:500 to 1:10. Preferably, however, the ratio of catalyst is confined to the range from about 1:200 to 1:25, but a ratio of 1:100 gives satisfactory results in most circumstances.

The polymerization reaction may take place in either liquid, solution, emulsion or gaseous phases. Hence, it is possible, and frequently even advisable, to use either liquid or gaseous diluents, especially if active catalysts such as boron trifluoride or aluminum chloride are present during the polymerization. Liquid diluents may perform several functions, acting as solvents for the monomer and/or the polymer, as solvents for the catalyst, as azeotropic constituents for carrying off water formed during the polymerization, as diluents for the control of polymerization rate, or, by their boiling points, as controls for the temperature of the reaction, as one phase of an emulsified reaction mixture, etc. Gaseous diluents are used primarily when the polymerization is carried out in gaseous phase, but also may be injected to carry off the water formed during polymerization, or as coolants, etc.

Both gaseous and liquid diluents are preferably substantially inert toward the other components of the reaction mixture in the temperature range encountered prior to, during and after reaction. The most satisfactory diluents are hydrocarbons of either aromatic or aliphatic character, but preferably are saturated aliphatic hydrocarbons. When the diluent is to be used in an aqueous phase polymerization, it is preferably chosen from the group of hydrocarbons boiling between about 125° C. to about 300° C., especially if it is to be used in azeotropic distillation of water during polymerization. Hydrocarbons which serve as suitable diluents include the dihydronaphthalenes; cycloheptane, the decanes, including 2-methyl nonane and 2,6-dimethyloctane; the octanes, including 2,2,3-trimethylpentane and 2-methyl-3-ethylpentane; the nonanes, such as 2-methyloctane, 2,4-dimethylheptane, 4-ethylheptane, the dodecanes such as dihexyl or 2,4,5,7-tetramethyloctane, etc.

When the polymerization is carried out in gaseous phase, the diluent may be a lower hydrocarbon such as methane, ethane, propane, butane, etc. which acts as a regulator or diluent for the reaction, but which can be stripped from the product with facility, subsequent to the polymerization.

The proportion of diluent is not a critical factor in carrying out the process of the present invention. However, it is a preferred practice to keep the reaction mixture as concentrated as possible, consistent with maintaining homogeneity, rate of polymerization, etc. Ordinarily, when a diluent is used for a liquid phase polymerization the initial proportion of diluent to glycol is from about 1:1 to about 20:1, but preferably is initially from about 2:1 to about 5:1. When the temperature of the reaction is substantially below the boiling point of the diluent, this ratio will remain unchanged throughout the reaction. If, however, the conditions are such that water formed by dehydration during polymerization distills azeotropically with part of the diluent, it is preferred to arrange a return inlet so that the diluent passing over in the azeotrope may be replaced in or near the polymerization zone, so as to maintain a substantially constant diluent to monomer ratio.

Other ingredients may be included in the polymerization mixture, or may be added from time to time during the polymerization. For example, the polymerization may be carried out in a closed system, such as an autoclave. In such a case, the water formed during the polymerization may be effectively removed by the presence of dehydrating agents which will combine with or absorb the water as it is formed. Inert gases such as nitrogen may be added to protect the hot polymerization mass from oxidation. Reactants, such as alcohols, may be present for the purpose of converting the hydroxyl radicals normally present on both ends of the polymer chains to other functional groups, as more particularly set forth hereinafter.

The temperature of polymerization may vary within a relatively wide range; but, unless the temperature of the reaction mixture is substantially above about 150° C., only a negligible amount of polymerization occurs, at least within a reasonable reaction period. If the reaction temperature is substantially above about 300° C., decomposition of the monomers and of the polymers takes place to such an extent that undue losses occur and the product requires extensive purification. The preferred polymerization temperature range is from about 150° C. to 225° C., with the optimum range being from about 175° C. to about 200° C. Therefore it is a preferred practice to conduct the polymerization temperature somewhat below the point at which the monomers will commence distilling; however, if higher temperatures are employed, the apparatus may be arranged so as to return the distilled glycols to or near the polymerization zone.

When the polymerization is carried out by disposing all of the reactants in a vessel and heating with continuous or intermittent distillation of water, the reaction time required to obtain products having molecular weights of about 200 or more is at least about 2 hours, and usually is about 6 hours, or even longer. Under a given set of conditions the molecular weight of the polymer varies directly with the amount of water formed, since a molecule of water is formed for every additional —O—R—(S)$_p$—R— link added to the polymer chain. Consequently, the average molecular weight of the polymeric product can be readily calculated by the amount of water which has been distilled out of the polymerization zone.

Following the polymerization period, the product is usually purified. The first step in purification is the removal of the catalyst. If this is a solid, suspended in the liquid polymer or a solution of the polymer, a simple filtration is all that is required. When the catalyst is in solution other means must be employed. For example, when sulfonic acids are the catalysts used, a preferred method for their removal from the polymer comprises dissolving or thinning the polymer with an organic solvent such as benzene, washing with concentrated caustic to convert the acid to the sodium salt, and subsequently extracting with water to remove the sodium salt of the acids and any remaining traces of caustic.

After removal of the catalyst, the product may be dehydrated in order to remove the last traces of water formed during polymerization and any water remaining from catalyst extraction operations. Water may be removed by the use of dehydrating agents, or by distillation, preferably under a sub-atmosphere pressure. If this latter method is employed, any solvents present and any monomers may be removed at the same time. Consequently, at the end of these operations there remains the polymer free of solvents, water and catalyst.

The polymer may be decolorized, if necessary, by percolation of solutions thereof through fuller's earth or activated clays, and further decolorizing takes place if the polymer is subject to hydrogenation.

On the other hand, polymers having the least color can be obtained only by following the percolation with hydrogenation. Neither percolation alone, nor hydrogenation alone, nor any of the ordinary decolorizing or bleaching procedures, results in the information of light colored polymers such as those obtained by treatment with fuller's earth followed by hydrogenation.

In carrying out the percolation through fuller's earth, oxygen-containing solvents such as acetone, methyl alcohol and dioxane are relatively ineffective for aiding in the removal of color from the subject polymers. The color removal appears to be specific in that hydrocarbon solvents, and especially aromatic hydrocarbon solvents are required, benzene and toluene giving the best results.

The hydrogenation step is essential for the reduction of color-sensitive functional groups, supposedly carbonylic in character. Tungsten sulfide and other sulfur-insensitive catalysts suitable for the reduction of carbonyls may be used. Temperatures employed vary from about 50 to about 275° C. and hydrogen pressures from about 500 to about 3000 lbs. per square inch are utilized. Subsequent to hydrogenation, the catalyst may be removed from the product, e. g. by super-centrifuging or filtration, and any solvents present may be flashed off to yield the light yellow polymer or co-polymer.

The polymers formed as described hereinbefore have hydroxyl groups on both ends of each polymer chain. These hydroxyls may be acted upon with such materials as etherifying or esterifying agents in order to obtain products having altered properties, such as solubility or improved action as lubricants, etc.

Various etherifying agents may be used for etherifying terminal hydroxyls. These include alkyl halides, such as methyl iodide, methyl bromide, ethyl chloride, propyl iodide; aralkyl halides such as benzyl chloride and methylbenzyl chloride; alkoxyalkyl chlorides such as methoxyethyl chloride; carboxyalkylating agents such as sodium monochloracetate; and alkylene halides such as allyl chloride. Ordinarily, the etherification is carried out in strongly basic environments; sodium hydroxide, liquid ammonia and quaternary ammonium bases and salts being the usual basic substances present.

Esterification of the terminal hydroxyls may be accomplished with various inorganic groups such as nitrates, phosphates or sulfates. However, preferred esterifying agents are the organic acid anhydrides or acid chlorides, and especially fatty acid anhydrides and their chlorides, including for example those of formic, acetic, propionic, butyric, hexoic, 2-ethylhexoic, and of higher fatty acids such as lauric, stearic, myristic, palmitic and capric acids. Usually, the esters are formed by treatment of the hydroxylated polymer with the anhydride of the acid in the presence of a catalyst such as sulfuric or phosphoric acid. The saturated fatty acids form the most stable esters with the subject polymers.

At times it is preferable to allow only partial etherification or esterification, thus forming half-ethers or half-esters instead of the di-ethers or di-esters theoretically possible. For other purposes the end-group hydroxyls may not only be partially or completely esterified or etherified, but also may be treated so as to result in the formation of mixed ethers, mixed esters or ether-esters.

Etherification or esterification of the end-groups may take place simultaneously with or subsequent to polymerization, and may be effected prior to or subsequent to polymerization, or the decolorizing and purifying processes described hereinbefore. Preferably, the end-group modification is carried out immediately after polymerization and before purification or decolorizing, but a secondary preferred time for modification is during the polymerization step itself.

When carrying out this latter step, the exact mechanism by which substitution of the end-groups occurs is obscure. However, it has been discovered, in accordance with this invention, that by using an active modifying agent, such as an alcohol, as the diluent during the polymerization, reaction occurs to give polymers having at least one substituted end-group, such as an ether group or ester group. For example, if alcohols such as n-octyl alcohol, n-decyl alcohol, n-dodecyl alcohol, etc., or their homologues, analogues or isomers, are used as diluents during the polymerization, the corresponding ethers of the polymers are formed. This provides a convenient method for modifying the properties of the polymer. It is preferred that the alcoholic diluent, or other modifying agent, have from about 6 to about 20 carbon atoms. The reactive diluent may be the only diluent present, or may be mixed with one or more inert diluents.

As pointed out hereinbefore, the polymeric lubricants formed as described herein have the general configuration

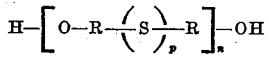

if the end-groups are unmodified. However, if one or both end-groups are etherified or esterified, the polymeric lubricant may be represented by the general formula

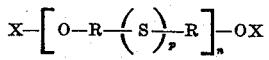

wherein in each of the above formulas $n$ is an integer greater than 1, $p$ is an integer, each R is an organic radical and each X is a terminal substituent such as a hydrogen atom, hydrocarbon radical or acyl group.

The products of the present invention vary from thin, non-viscous liquids suitable as instrument oils, etc., to viscous oils suitable for heavy lubrication, and, if the molecular weight is great enough, products which are gels or solids at room temperature are formed. The polymers may be of any molecular weight, dependent at least in part upon the extent to which the intermediate dehydration is carried. Polymers having molecular weights from about 100 to 10,000 are readily prepared, but those having molecular weights between about 200 and 1500 are preferred, since they have properties of viscosity and solubility which give them extensive utility.

Polymers having molecular weights below about 200 may be water-soluble, or at least may be affected by water. Those having higher molecular weights, above about 200 usually are soluble in organic solvents, such as aromatic hydrocarbons, esters, ethers and alcohols. The solubility of the polymer varies with (a) molecular weight; (b) identity of the monomer; and (c) end-group modification. If, however, the polymer, and especially those having molecular weights below about 1100, have end-groups of substantial size, such as a n-decyl ether group, the properties such as solubility, etc., may be substantially modified.

When the molecular weight is less than about 1500, the polymers have freezing points varying from about +40° C. to about −70° C. Again, this property varies with the three factors given in the paragraph above.

The polymers have viscosity characteristics which make them useful as lubricants. Polymers having molecular weights between about 200 and about 1500 have viscosities from about 30 to about 400 centistokes at 100° F., and from about 4.5 to about 50 centistokes at 210° F. These viscosities correspond to lubricating oils having S. A. E. numbers from about 10 to about 80.

Another important viscosity characteristic possessed by the polymers is their excellent viscosity indices. Dependent upon the three variables of molecular weight, monomer identity, and end-group modification, the viscosity index may be varied from about 100 to about 165, or even higher.

The polymers of the present invention are suitable for a number of important uses, such as engine lubricants, hydraulic brake fluids, instrument oils, stand-by oils, grease bases, plasticizers for nitro-cellulose, cellulose ethers, cellulose esters, methacrylate polymers, phenol-formaldehyde resins, etc. The compatibility of the polymers with resins or cellulose derivatives is controlled by the molecular weight of the polymer, the identity of the monomer or monomers from which it is made, and the modification of the end-groups.

The polymers are primarily useful for lubrication purposes, since they have such excellent stability toward oxidation, and leave practically no engine deposits.

The value of the polymers as lubricants is enhanced by their thermal stability and by their inherent extreme pressure lubricant characteristics. Because of this latter property they may be admixed with other lubricants, either synthetic or petroleum, in order to impart extreme pressure characteristics thereto.

Having described the polymeric lubricants, examples are now presented illustrating specific embodiments of the invention:

EXAMPLE I.—POLYMERIZATION OF BIS(BETA-HYDROXYETHYL) SULFIDE

Into a kettle attached to a phase-separating still-head was charged 250 parts of bis(beta-hydroxyethyl) sulfide, 150 parts of decalin as an azeotroping agent, and 5 parts of para-toluene sulfonic acid. The reaction mixture was heated for 10 hours, with a kettle temperature of 140–160° C., at the end of which time the water recovered corresponded to the formation of a polymer with a molecular weight of 1000. The decalin was flash distilled under reduced pressure, the residue taken up in acetone, neutralized and then concentrated at 100° C. at 5 mm. mercury pressure. Other polymers were prepared having varying molecular weights by heating for longer or shorter times in order to eliminate more or less water. The properties of the products are given in Table 1, below.

*Table 1*

| Sample | Azeotroping agent | Molecular Weight | Viscosity Centistokes 100° F. | Viscosity Centistokes 210° F. | Viscosity Index | SAE No. |
|---|---|---|---|---|---|---|
| A | Xylenes | 530 | 149.6 | 18.37 | 128 | 50 |
| B | do | 780 | | | | |
| C | Decalin | 1,050 | 360 | 43.56 | 131 | 70 |
| D | Xylenes | 2,920 | | | | |

EXAMPLE II.—POLYMERIZATION OF BIS-(GAMMA-HYDROXYPROPYL) SULFIDE

The conditions of polymerization described in Example I were applied to bis(gamma-hydroxypropyl) sulfide, the reaction mixture being heated for six and one-half hours at 170–190° C. The residue was washed with sodium carbonate solution, decolorized by heating briefly with activated carbon, and the decalin removed by flash distillation. An 80% yield of an oil was obtained, having the following properties:

| | |
|---|---|
| Molecular weight | 580 |
| Viscosity, centistokes at 100° F | 178.3 |
| Viscosity, centistokes at 210° F | 23.9 |
| Viscosity index | 134 |
| Oil SAE No | 60 |
| Pour point °F | −50 |

EXAMPLE III.—THERMAL STABILITY

The polymer prepared as described in Example II was heated in a carbon dioxide atmosphere at 150° C. for 24 hours in order to determine the effect of heat on the properties of the polymer. The results obtained are given in Table 2, below.

*Table 2*

| | Polymer of bis(gamma-hydroxypropyl) sulfide | |
|---|---|---|
| | Before Heating | After Heating |
| Viscosity, centistokes per 100° F | 178.3 | 253.4 |
| Viscosity centistokes per 210° F | 23.9 | 32.6 |
| Viscosity Index | 134 | 133 |

EXAMPLE IV.—WEAR TEST

A polymer of bis(beta-hydroxyethyl) sulfide, corresponding to sample A of Example I, was tested as an extreme pressure agent, using the 4-ball apparatus described by Boelage in "Engineering," July 14, 1933. In this test, the oil being tested is used to lubricate ball bearings at various temperatures under predetermined loads, the coefficient of friction and wear scar of one of the bearings being determined. The results obtained are given in Table 3 below:

Table 3

| Temperature | 80° C. | 130° C. |
|---|---|---|
| Average diameter of wear scar, mm | 0.25 | 0.26 |
| Coefficient of friction after 5 sec | 0.050 | 0.044 |
| Coefficient of friction, average of values at 30, 40, 50, and 60 sec | 0.050 | 0.041 |

EXAMPLE V.—PREPARATION OF 2-ETHYL HEXOATE OF POLYMER DERIVED FROM BIS(BETA-HYDROXYETHYL) SULFIDE

A mixture of 500 parts of a polymer of bis(beta-hydroxyethyl) sulfide, 300 parts of 2-ethylhexoic acid, 20 parts para-toluene sulfonic acid and 1000 parts benzene were refluxed under a separating still head until no more water separated. The reaction mixture was decolorized with activated charcoal, washed with dilute sodium hydroxide solution and with water, then dried at 100° C. under reduced pressure. The esterified polymer so produced had the properties which are given in Table 4, under Example VI.

EXAMPLE VI.—THERMAL STABILITY

Polymeric bis(beta-hydroxyethyl) sulfide and the esterified derivatives thereof, prepared as described in Example V, were heated for 24 hours at 150° C. under a carbon dioxide atmosphere. The change in the properties of the two polymers under these conditions are given in Table 4, below.

Table 4

|  | Polymeric bis (betahydroxyethyl) sulfide | | 2-ethylhexoate of polymeric bis (beta-hydroxyethyl) sulfide | |
|---|---|---|---|---|
|  | Before Test | After Test | Before Test | After Test |
| Viscosity at 100° F. centistokes | 149.6 | 96.6 | 17.16 | 14.1 |
| Viscosity at 210° F. centistokes | 18.37 | 17.54 | 3.66 | 3.22 |
| Viscosity Index | 128 | 147 | 110 | 104 |

EXAMPLE VII.—OXIDATION STABILITY

Seventy-five grams of polymeric bis(beta-hydroxyethyl) sulfide, both in the presence and absence of 1% phenyl-alpha-naphthylamine, and of bis(gamma-hydroxypropyl) sulfide containing 1% phenyl-alpha-naphthylamine were heated at 140° C. in the presence of 75 sq. cm. copper, under an initial oxygen pressure of 50 p. s. i. The rate at which the oxygen pressure dropped was in indication of the samples' stability towards oxidation. Table 5 gives the data obtained.

Table 5

| Sample | Time for pressure to drop 10 lbs. | Time for pressure to drop 20 lbs. |
|---|---|---|
|  | Hours | Hours |
| Polymer of bis(beta-hydroxyethyl) sulfide | 31 | 54 |
| Polymer of bis(beta-hydroxyethyl) sulfide (containing 1% inhibitor) | 58 | 110 |
| Polymer of bis(gamma-hydroxypropyl) sulfide (containing 1% inhibitor) | 37 | 54 |

EXAMPLE VIII.—EXTREME PRESSURE PROPERTIES

A polymer of bis(gamma-hydroxypropyl) sulfide was tested for extreme pressure properties in the 4-ball machine described by Boelage, referred to in Example 4, above. All tests were run for 1 minute at 1500 r. p. m., the loads being varied. The scar diameters caused by the various loads are given in Table 6, below:

Table 6

| Load, kg. | Scar Diameter, mm. |
|---|---|
| 60 | 0.41 |
| 80 | 0.46 |
| 100 | 0.53 |
| 200 | 1.35 |
| 300 | 2.03 |
| 400 | 3.43 |
| 500 | Welded |

EXAMPLE IX.—POLYMERIZATION OF BIS-(GAMMA-HYDROXYPROPYL) DISULFIDE

Two hundred thirty-four parts bis(gamma-hydroxypropyl) disulfide, 9.7 parts para-toluene sulfonic acid and 350 parts diethyl benzene were refluxed under a phase-separating still head for two hours, the temperature in the still being about 160° C. The product was washed with water, after which solvent was removed by flashing, subsequent to which the product was dried over anhydrous sodium sulfate. The product was 127 parts of a dark, viscous oil having the following characteristics:

| | |
|---|---|
| Sulfur, weight per cent | 38.0 |
| Molecular weight | 520 |
| Viscosity, centistokes at 100° F. | 340.0 |
| Viscosity, centistokes at 210° F. | 25.23 |
| Viscosity index | 103 |

We claim as our invention:

1. A composition of matter suitable for use as a synthetic lubricant consisting essentially of a liquid condensation polymer of a compound from the group consisting of bis (hydroxyalkyl) sulfides and bis (hydroxyalkyl) polysulfides, said condensation polymer having a molecular weight of 200–1500, and having been prepared by heating the said compound with 0.002–10% by weight of a dehydration catalyst at a temperature of 150–300° C. for a period of 2–6 hours.

2. A composition of matter suitable for use as a synthetic lubricant, consisting essentially of a liquid condensation polymer of a bis(hydroxyalkyl) sulfide, said condensation polymer having a molecular weight of 200–1500, and having been prepared by heating a bis(hydroxyalkyl) sulfide with 0.002–10% by weight of a dehydration catalyst at a temperature of 150–300° C. for a period of 2–6 hours.

3. A composition of matter suitable for use as a synthetic lubricant, consisting essentially of a liquid condensation polymer of a bis(hydroxyalkyl) sulfide, said condensation polymer having a molecular weight of 200–1500, and having been prepared by heating a bis(hydroxyalkyl) sulfide with 0.002–10% by weight of a para-toluene sulfonic acid at a temperature of 150–300° C. for a period of 2–6 hours.

4. A composition of matter suitable for use as a synthetic lubricant, consisting essentially of a liquid condensation polymer of a bis(gamma-hydroxypropyl) sulfide, said condensation polymer having a molecular weight of 200–1500, and having been prepared by heating a bis(gamma-hydroxypropyl) sulfide with 0.002–10% by weight of a dehydration catalyst at a temperature of 150–300° C. for a period of 2–6 hours.

5. A composition of matter suitable for use as a synthetic lubricant, consisting essentially of a liquid condensation polymer of a bis(beta-hydroxyethyl) sulfide, said condensation polymer having a molecular weight of 200–1500, and having been prepared by heating a bis(beta-hydroxyethyl) sulfide with 0.002–10% by weight of a dehydration catalyst at a temperature of 150–300° C. for a period of 2–6 hours.

6. A composition of matter suitable for use as a synthetic lubricant, consisting essentially of a liquid condensation polymer of a bis(gamma-hydroxypropyl) disulfide, said condensation polymer having a molecular weight of 200–1500, and having been prepared by heating a bis(gamma-hydroxypropyl) disulfide with 0.002–10% by weight of a dehydration catalyst at a temperature of 150–300° C. for a period of 2–6 hours.

7. A process for the preparation of a liquid condensation polymer suitable for use as a synthetic lubricant which comprises heating a compound from the group consisting of bis (hydroxyalkyl) sulfides and bis (hydroxyalkyl) polysulfides with 0.002–10% by weight of a dehydration catalyst at a temperature of 150–300° C. for a period of 2–6 hours.

8. A process for the preparation of a liquid condensation polymer suitable for use as a synthetic lubricant which comprises heating bis(hydroxyalkyl) sulfide with 0.002–10% by weight of a dehydration catalyst at a temperature of 150–300° C. for a period of 2–6 hours.

9. A process for the preparation of a liquid condensation polymer suitable for use as a synthetic lubricant which comprises heating bis(beta-hydroxyethyl) sulfide with 0.005–4% by weight of a dehydration catalyst at a temperature of 150–225° C. for a period of 2 to 6 hours.

10. A process for the preparation of a liquid condensation polymer suitable for use as a synthetic lubricant which comprises heating bis(gamma-hydroxypropyl) sulfide with 0.005–4% by weight of a dehydration catalyst at a temperature of 150–225° C. for a period of 2 to 6 hours.

11. A process for the preparation of a liquid condensation polymer suitable for use as a synthetic lubricant which comprises heating bis(gamma-hydroxypropyl) disulfide with 0.005–4% by weight of a dehydration catalyst at a temperature of 150–225° C. for a period of 2 to 6 hours.

SEAVER A. BALLARD.
RUPERT C. MORRIS.
JOHN L. VAN WINKLE.

REFERENCES CITED

The following references are of record in the file of this patent:

UNITED STATES PATENTS

| Number | Name | Date |
| --- | --- | --- |
| 2,198,828 | Lieber | Apr. 30, 1940 |
| 2,220,941 | Moran | Nov. 12, 1940 |
| 2,326,483 | Moran | Aug. 10, 1943 |
| 2,332,869 | Okita | Oct. 26, 1943 |
| 2,378,576 | Okita et al. | June 19, 1945 |

OTHER REFERENCES

Patrick, "Transaction Faraday Society," vol. 32, January 1936.